(12) United States Patent
Wei

(10) Patent No.: US 8,780,209 B2
(45) Date of Patent: Jul. 15, 2014

(54) SYSTEMS AND METHODS FOR COMPARING MEDIA SIGNALS

(75) Inventor: Jeff Wei, Richmond Hill (CA)

(73) Assignee: Evertz Microsystems Ltd., Burlington, Ontario ( * ) Notice: Subject to any disclaimer, the term of this patent is extended or adjusted under 35 U.S.C. 154(b) by 1013 days.

(21) Appl. No.: 12/705,217

(22) Filed: Feb. 12, 2010

(65) Prior Publication Data

US 2010/0201824 A1    Aug. 12, 2010

Related U.S. Application Data

(63) Continuation-in-part of application No. 12/116,445, filed on May 7, 2008.

(51) Int. Cl.
*H04N 17/00*    (2006.01)
*H04N 21/43*    (2011.01)
*H04L 29/06*    (2006.01)

(52) U.S. Cl.
CPC .............. *H04N 21/43* (2013.01); *H04L 65/601* (2013.01); *H04L 65/80* (2013.01); *H04L 29/06027* (2013.01)
USPC ...... 348/180; 348/500; 348/512; 348/E5.009; 348/E17.001; 375/224; 375/354; 386/248; 709/203; 709/231; 709/233

(58) Field of Classification Search
CPC ...... H04N 21/43; H04L 65/80; H04L 65/607; H04L 67/322
USPC ................................ 348/180; 702/69; 386/96
IPC ....................................................... H04N 17/00
See application file for complete search history.

(56) References Cited

U.S. PATENT DOCUMENTS

| | | | |
|---|---|---|---|
| 5,530,483 A | 6/1996 | Cooper et al. | |
| 5,751,368 A | 5/1998 | Cooper | |
| 6,330,033 B1 | 12/2001 | Cooper | |
| 6,351,281 B1 | 2/2002 | Cooper | |
| 6,584,138 B1 | 6/2003 | Neubauer et al. | |
| 6,836,295 B1 | 12/2004 | Cooper | |
| 7,710,499 B2 | 5/2010 | Cooper | |
| 8,159,610 B2 | 4/2012 | Cooper | |
| 8,174,558 B2 | 5/2012 | Smith et al. | |
| 2003/0063219 A1 | 4/2003 | Bellers | |
| 2006/0078305 A1* | 4/2006 | Arora et al. ...................... | 386/96 |
| 2006/0276983 A1* | 12/2006 | Okamoto et al. ............... | 702/69 |
| 2007/0291832 A1 | 12/2007 | Diab et al. | |
| 2008/0019430 A1* | 1/2008 | Suzuki et al. .................. | 375/150 |
| 2010/0138489 A1* | 6/2010 | Corley et al. .................. | 709/203 |

* cited by examiner

*Primary Examiner* — Jay Patel
*Assistant Examiner* — Neil Mikeska
(74) *Attorney, Agent, or Firm* — Bereskin & Parr LLP/S.E.N.C.R.L., s.r.l.

(57) ABSTRACT

Various systems and methods for comparing media signals are disclosed. In some embodiments, media signals are compared by identifying characteristic features in the respective signals and then analyzing the characteristic features to determine if the signals contain corresponding content. In other embodiments, the characteristic features are analyzed to determine the extent to which the signals are synchronized in time.

25 Claims, 12 Drawing Sheets

SYSTEMS AND METHODS FOR COMPARING MEDIA SIGNALS

FIELD

The described embodiments relate to systems and methods for comparing media signals. The media signals may be video signal, audio signals, video/audio signals or the like. More particularly, the described embodiments relate to systems and methods for comparing media signals by extracting one or more characteristic features from the media signals to produce extracted feature data and comparing the extracted feature data.

BACKGROUND

In many broadcast systems and other communication systems, it is desirable to switch from one version or instance of a media signal or stream to another version or instance of the media stream or signal. For example, a broadcast facility may produce a primary version and a secondary version of an audio/video signal. The primary signal may be broadcast on a particular channel. If the primary signal becomes unavailable, it may be desirable to broadcast the secondary signal on the channel. When switching the source for the channel from the primary to the secondary signal, it can be desirable to ensure that the primary and secondary signals are synchronized in time such that the transmission on the channel remains synchronized in content.

Many broadcast facilities receive, generate and transmit a large number of signals. When intending to make a switch from one version of a signal to another version of a signal it is possible to inadvertently switch to an unrelated signal resulting in an undesirable transition on a channel from one program to another program.

In some cases, two versions of a signal in a broadcast system may be out of synchronization such that one of the signals is running ahead of the other. When a switch is made from one version of the signal to another version of the signal, it is possible that a portion of the media signal will be presented twice, or a portion of the media signal may be skipped altogether.

Accordingly, there is a need for systems and methods for assessing the synchronization of two media streams and for identifying whether two streams contain corresponding content.

SUMMARY

The embodiments described herein provide in one aspect a method of comparing media signals comprising: receiving a first input media signal and a second input media signal; extracting a first characteristic feature from the first input media signal to generate a first feature signal; extracting a second characteristic feature from the second input media signal to generate a second feature signal; and providing a match confidence signal based on the first and second feature signals, wherein the match confidence signal is an estimate of the likelihood that that the first input media signal corresponds to the second input media signal.

In one feature of that aspect, providing the match confidence signal includes: sampling the first feature signal to produce a first sampled feature signal; sampling the second feature signal to produce a second sampled feature signal; cross-correlating the first and second sampled feature signals to generate a cross-correlation signal; and modifying the match confidence signal based on the cross-correlation signal.

In another feature of that aspect, the match confidence signal has a value between a high match value and a low match value and wherein modifying the match confidence signal includes: analyzing the cross-correlation signal to identify a peak exceeding a matching peak threshold; if a peak exceeding the matching peak threshold is identified, then modifying the match confidence signal to be closer to the high match value; and if a peak exceeding the matching peak threshold is not identified, then modifying the match confidence signal to be closer to the low match value.

In another feature of that aspect, the match confidence signal has a value between a high match value and a low match value and wherein providing the match confidence signal includes: analyzing the cross-correlation signal to identify a current peak position within the cross-correlation signal; if the current peak position corresponds to one or more previous peak positions, then modifying the match confidence signal to be closer to the high match value; and if the current peak position does not correspond to the one or more previous peak positions, then modifying the match confidence signal to be closer to the low match value.

In another feature of that aspect, the method further includes: comparing the first feature signal to the second feature signal; and modifying the match confidence signal based on the results of the comparison.

In another feature of that aspect, comparing the first feature signal to the second feature signal includes: identifying a portion of the first feature signal; identifying a portion of the second feature signal corresponding to the identified portion of the first feature signal; and comparing the identified portions of the first and second feature signals.

In another feature of that aspect, identifying the portion of the second feature signal corresponding to the identified portion of the first feature signal includes: analyzing the cross-correlation signal to identify a current peak position within the cross-correlation signal; converting the current peak position into a delay value, wherein the delay value represents the time delay between the first and second input media signals; and identifying the portion of the second feature signal based on the delay value.

In another feature of that aspect, providing the match confidence signal includes: sampling the first feature signal to produce a first sampled feature signal; sampling the second feature signal to produce a second sampled feature signal; cross-correlating a first portion of the first sampled feature signal and a first portion of the second sampled feature signal to generate a first cross-correlation signal; identifying a second portion of the first sampled feature and a second portion of the second sampled feature, wherein the second portions of the first and second sampled feature signals are smaller than the first portions of the first and second sampled feature signals respectively; cross-correlating the second portion of the first sampled feature signal and the second portion of the second sampled feature signal to generate a second cross-correlation signal; and modifying the match confidence signal based on the first and second cross-correlation signals.

In another feature of that aspect, identifying the second portion of the first sampled feature and the second portion of the second sampled feature includes: analyzing the first cross-correlation signal to identify a current peak position within the first cross-correlation signal; converting the current peak position into a delay value, wherein the delay value represents the time delay between the first and second input media signals; and identifying the second portions of the first and second feature signals based on the delay value.

In another feature of that aspect, the match confidence signal is provided as a series of discrete values. In another feature of that aspect, the match confidence signal is provided as an analog signal.

In another feature of that aspect, first characteristic feature includes at least one characteristic selected from the group consisting of: average luma value, average color value, average motion distance, and contrast level. In another feature of that aspect, the first characteristic feature includes at least one characteristic selected from the group consisting of: envelope of signal amplitude, average loudness level, peak formant, and average zero crossing rate.

The embodiments described herein provide in another aspect a system for comparing media signals comprising: a first input port for receiving a first input media signal; a second input port for receiving a second input media signal; a first extraction module for extracting a first characteristic feature from the first input media signal to generate a first feature signal; a second extraction module for extracting a second characteristic feature from the second input media signal to generate a second feature signal; and a match confidence signal generator for providing a match confidence signal based on the first and second feature signals, wherein the match confidence signal is an estimate of the likelihood that that the first input media signal corresponds to the second input media signal.

In another feature of that aspect, the first extraction module comprises: a first feature extractor for extracting the first characteristic feature from the first input media signal to generate the first feature signal; and a first sampling module for sampling the first feature signal to produce a first sampled feature signal; the second extraction module comprises: a second feature extractor for extracting the second characteristic feature from the second input media signal to generate the second feature signal; and a second sampling module for sampling the second feature signal to produce a second sampled feature signal; and the match confidence signal generator comprises: a cross correlation module for cross-correlating the first and second sampled feature signals to generate a cross-correlation signal; and a strength and consistency analyzer for modifying the match confidence signal based on the cross-correlation signal.

In another feature of that aspect, the match confidence signal has a value between a high match value and a low match value and wherein the strength and consistency analyzer comprises: a peak locator for analyzing the cross-correlation signal to identify a current peak value within the cross-correlation signal; and a match confidence signal adjustment module for: if the current peak value exceeds a matching peak threshold, then modifying the match confidence signal to be closer to the high match value; and if the current peak value does not exceed the matching peak threshold, then modifying the match confidence signal to be closer to the low match value.

In another feature of that aspect, the match confidence signal has a value between a high match value and a low match value and wherein the strength and consistency analyzer comprises: a peak locator for analyzing the cross-correlation signal to identify a current peak position within the cross-correlation signal; and a match confidence signal adjustment module for: if the current peak position corresponds to one or more previous peak positions, then modifying the match confidence signal to be closer to the high match value; and if the current peak position does not correspond to the one or more previous peak positions, then modifying the match confidence signal to be closer to the low match value.

In another feature of that aspect, the match confidence signal generator further comprises a small window analyzer for: comparing the first feature signal to the second feature signal; and modifying the match confidence signal based on the results of the comparison.

In another feature of that aspect, comparing the first feature signal to the second feature signal includes: identifying a portion of the first feature signal; identifying a portion of the second feature signal corresponding to the identified portion of the first feature signal; and comparing the identified portions of the first and second feature signals.

In another feature of that aspect, identifying the portion of the second feature signal corresponding to the identified portion of the first feature signal includes: analyzing the cross-correlation signal to identify a current peak position within the cross-correlation signal; converting the current peak position into a delay value, wherein the delay value represents the time delay between the first and second input media signals; and identifying the portion of the second feature signal based on the delay value.

In another feature of that aspect, the first extraction module comprises: a first feature extractor for extracting the first characteristic feature from the first input media signal to generate the first feature signal; and a first sampling module for sampling the first feature signal to produce a first sampled feature signal; the second extraction module comprises: a second feature extractor for extracting the second characteristic feature from the second input media signal to generate the second feature signal; and a second sampling module for sampling the second feature signal to produce a second sampled feature signal; and the match confidence signal generator comprises: a cross correlation module for cross-correlating a first portion of the first sampled feature signal and a first portion of the second sampled feature signal to generate a first cross-correlation signal; a second cross correlation module for cross-correlating a second portion of the first sampled feature signal and a second portion of the second sampled feature signal to generate a second cross-correlation signal, wherein the second portions of the first and second sampled feature signals are smaller than the first portions of the first and second sampled feature signals respectively; and at least one strength and consistency analyzer for modifying the match confidence signal based on the first and second cross-correlation signals.

In another feature of that aspect, the second cross correlation module is adapted to identify the second portions of the first and second sampled feature signals, wherein identifying the second portions of the first and second sampled feature signals includes: analyzing the first cross-correlation signal to identify a current peak position within the first cross-correlation signal; converting the current peak position into a delay value, wherein the delay value represents the time delay between the first and second input media signals; and identifying the second portions of the first and second feature signals based on the delay value.

In another feature of that aspect, the match confidence signal is provided as a series of discrete values. In another feature of that aspect, the match confidence signal is provided as an analog signal.

In another feature of that aspect, wherein the first characteristic feature includes at least one characteristic selected from the group consisting of: average luma value, average color value, average motion distance, and contrast level. In another feature of that aspect, the first characteristic feature includes at least one characteristic selected from the group consisting of: envelope of signal amplitude, average loudness level, peak formant, and average zero crossing rate.

Further aspects and advantages of the embodiments described will appear from the following description taken together with the accompanying drawings.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
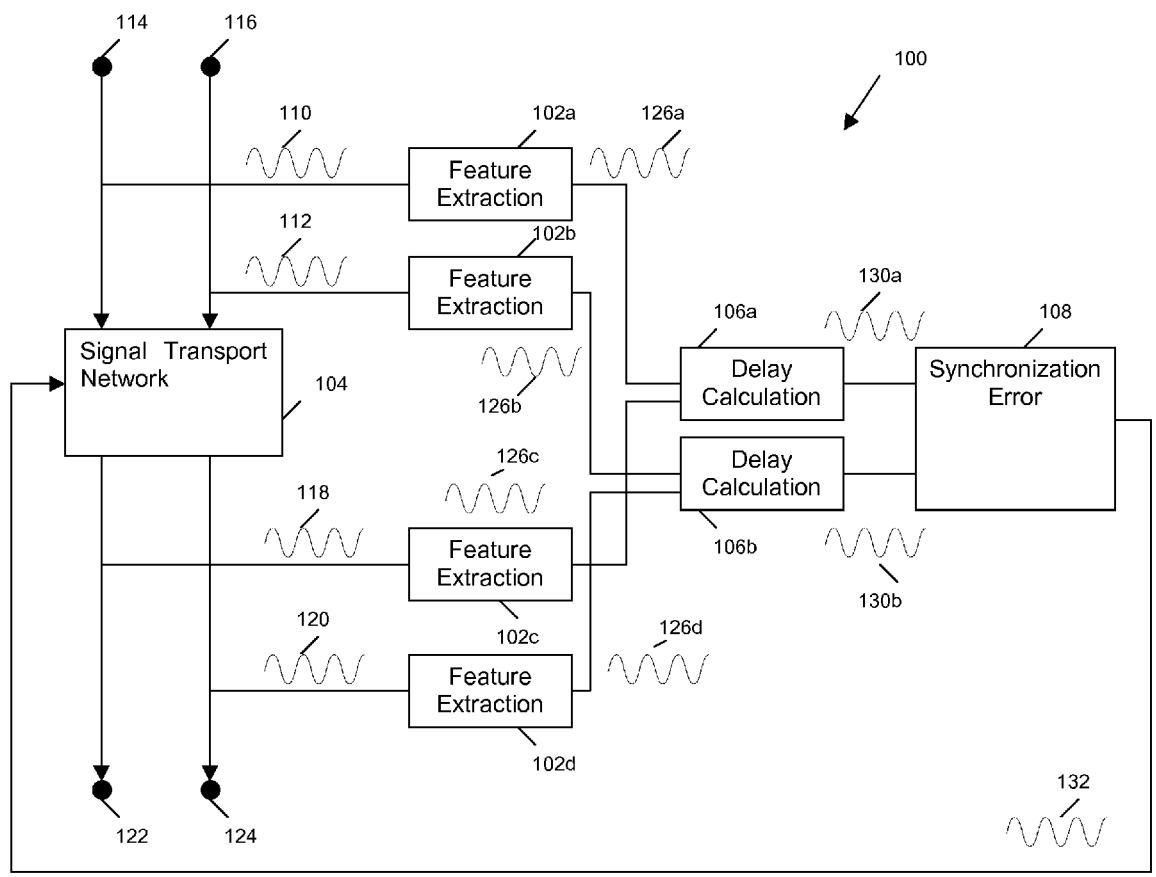
FIG. 1 is a block diagram of a system for determining the extent to which two media signals are out of sync with each other in accordance with at least one embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various exemplary embodiments described herein.

Embodiments described herein relate to methods and systems for comparing two or more media signals. The media signals may be video signals, audio signals, video/audio signals or the like. The methods and systems involve extracting one or more characteristic features from the media signals to produce extracted feature data for each media signal, and then comparing the extracted feature data. In some embodiments, the extracted feature data may be used to determine the synchronization error between the media signals. In other embodiments, the extracted feature data may be used to determine the delay between the media signals. In still other embodiments, the extracted feature data may be used to determine the likelihood that the media signals match. Two media signals are said to match if they represent the same content. For example, a high quality video of a movie and a DVD version of the same movie are said to match.

The systems described herein may be implemented in hardware or software, or a combination of both. However, preferably, at least part of the system is implemented in computer programs executing on programmable computers or other processing devices, including programmable, application specific, embedded and other devices. For example, a processing device may typically comprise a processor, a data storage system, at least one input device, and at least one output device. For example and without limitation, the programmable computers may be a personal computer or laptop, logic arrays such as a programmable logic array (PLA), gate arrays such a floating point gate array (FPGA), a suitable configured circuit, such as integrated circuit or an application specific integrated circuit (ASIC). Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the system is capable of being distributed in a computer program product comprising a physical computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Reference is now made to FIG. 1, in which a system 100 for determining the extent to which two media signals are out of sync with each other in accordance with an embodiment is illustrated. The system 100 includes four feature extraction modules 102a, 102b, 102c and 102d, a signal transport network 104, two delay calculation modules 106a and 106b and a synchronization error module 108.

Two input media signals 110 and 112 are input into the system 100 at input terminals 114 and 116. Typically, the input media signals 110 and 112 are reproduced continuously and are synchronized such that corresponding portions of each signal are reproduced at about the same time. Each of the input terminals 114 and 116 is coupled to a feature extraction module 102a, 102b, and also to the signal transport network 104. The input media signals 110 and 112 are transported through the signal transport network 104 and output as output media signals 118 and 120 respectively at output terminals 122 and 124.

In this embodiment, the first and second input media signals 110 and 112 may be video signals, audio signals, video/audio signals or the like. For example, the first input media signal 110 may be a video signal and the second input media signal 112 may be an associated audio signal. Typically, the video signal and the audio signal are synchronized such that the audible contents of the audio signal are synchronized with the visual contents of the video signal. For example, the audio and video signals may be produced by an audio/video source such as a live video/audio capture module, a video tape player, a video server, a DVD player or a set-top television decoder.

The signal transport network 104 will typically include audio and video signal transportation devices which transport the input media signals 110 and 112 from one point to another. The signal transport network 104 may also include audio and video processing devices (i.e. a decoder, an MPEG compressor, a video standard converter) which modify the input media signals 110 and 112. Where the signal transport network 104 includes processing devices, the output media signals 118, 120 may be different than the corresponding input media signals 110, 112. For example, an MPEG compressor introduces compression artifacts in a video signal and a video standard converter changes the video size and/or frame rate of the video signal. Typically, the first and second input media signals 110 and 112 will travel through different transmission paths through the signal transport network 104, although this is not necessary.

For example, where the first input media signal 110 is a video signal, it may travel through various devices including a composite decoder, an MPEG compressor, a transport stream multiplexer, a transport link, a transport stream de-multiplexer, an MPEG de-compressor or a composite encoder. The transport link may include an uplink modulator, a ground to satellite link, a satellite to ground link and a satellite receiver. Each of the processing units (i.e. the MPEG compressor, transport stream multiplexer) and the transport link will introduce a certain amount of delay so that the first output media signal 118 will be a delayed version of the first input media signal 110.

Where the second input media signal 112 is an audio signal, it may travel the through an audio dynamic range processor, an audio compressor, a transport stream multiplexer, a transport link, a transport stream de-multiplexer and an audio de-compressor. Each of these processing units will also introduce delay so that the second output media signal 120 will be a delayed version of the second input media signal 112. The delay in the first output media signal 118 will typically be different from the delay in the second output media signal 120, with the result that the first and second output media signals 118 and 120 will not be synchronized when they reach the output terminals 122 and 124. Processing elements in the network 104 may shift the audio signal relative to a reference element in the audio signal such that the audio generated by the audio signal appears to be advanced or delayed compared to the position of the reference element.

The feature extraction modules 102a, 102b, 102c and 102d, the delay calculation modules 106a, 106b and the synchronization error module 108 operate to determine the extent to which the two output media signals 118 and 120 have become unsynchronized. Specifically, each of the feature extraction modules 102a, 102b, 102c, 102d extracts at least one characteristic feature of the input and output media signals 110, 112, 118 and 120 to produce a corresponding extracted feature signal 126a, 126b, 126c and 126d. The delay calculation modules 106a and 106b determine the amount of delay between corresponding input and output signals (e.g. 110, 118; 112, 120) from the extracted characteristic feature signals 126a, 126b, 126c and 126d, and output the delay as a delay signal 130a or 130b. The synchronization error module 108 determines the difference between the two delay signals 130a and 130b and provides a synchronization error signal 132 corresponding to the difference.

The first feature extraction module 102a extracts one or more characteristic features of the first input media signal 110 and produces a first extracted feature signal 126a. The second feature extraction module 102b extracts one or more characteristic features of the second input media signal 112 and produces a second extracted feature signal 126b. The third feature extraction module 102c extracts one or more characteristic features of the first output media signal 118 and produces a third extracted feature signal 126c. The fourth feature extraction module 102d extracts one or more characteristic features of the second output media signal 120 and produces a fourth extracted feature signal 126d.

Figure 2:
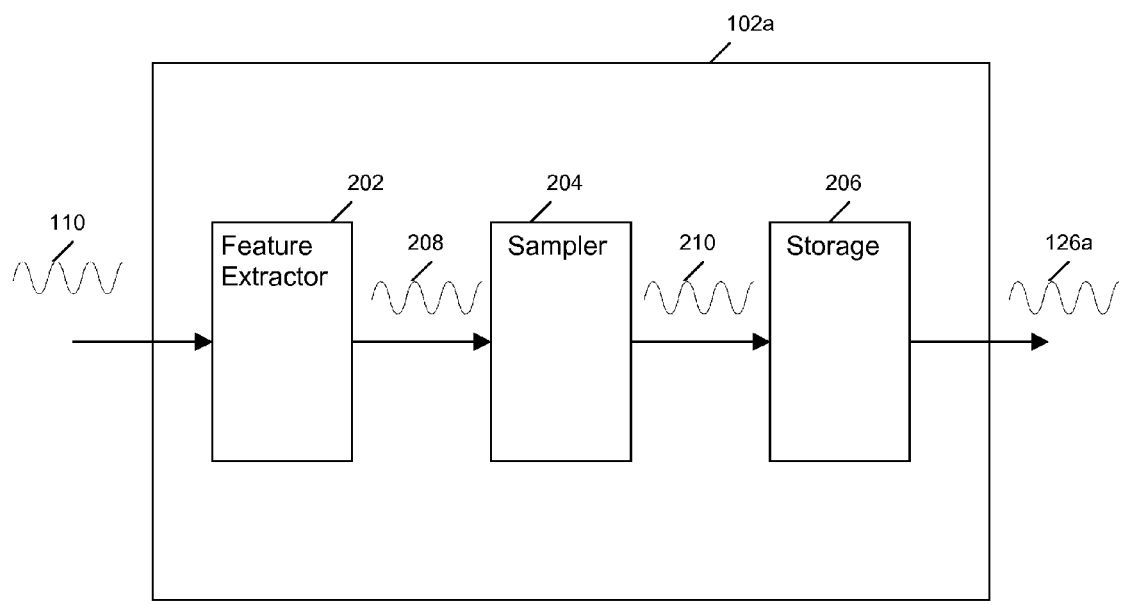
FIG. 2 is a block diagram of the feature extraction module of FIG. 1 in accordance with one embodiment.

Reference is now made to FIG. 2, which is a block diagram of the first feature extraction module 102a in accordance with an embodiment. The first feature extraction module 102a shown in FIG. 2 and described herein is intended to be an example of a feature extraction module and the principles and concepts described in relation to FIG. 2 should not be limited to the first feature extraction module 102a. Specifically, any or all of the feature extraction modules 102a, 102b, 102c and 102d of FIG. 1 may be implemented in a similar manner to the feature extraction module 102a shown in FIG. 2.

The first feature extraction module 102a shown in FIG. 2 includes a feature extractor 202, a sampling module 204 and a storage module 206.

The first feature extractor 102a receives the first input media signal 110 and extracts one or more characteristic features from the media signal 110 and outputs a feature signal 208. Depending on the characteristic feature used, the feature signal 208 may be a continuous time varying signal or a set of discrete values.

A characteristic feature of a media signal is a feature that varies over time. Various aspects of a media signal may be used as characteristic features and aspects that have a pattern that is not easily varied or corrupted by the processing in the network 104 are preferred. Where the first input media signal 110 is an audio signal, one or more of the following may be used as a characteristic features: the envelope of audio signal amplitude, the average loudness level, the peak formant of the audio signal and the average zero crossing rate. Where the first input media signal 110 is a video signal, one or more of the following may be used as a characteristic features: the average luma or color value, the average motion distance, and the contrast level of the signal. Other aspects of the audio and video signals could also be used as a characteristic feature.

The sampling module 204 receives the feature signal 208 from the feature extractor 202, samples it at a predetermined sampling frequency, $f_s$, and outputs a sampled feature signal 210. As noted above, in system 100 there are four feature extraction modules 102a, 102b, 102c, and 102d—one for each of the input and output media signals 110, 112, 118 and 120. The sampling frequency of the four feature extraction modules 102a, 102b, 102c, and 102d need not be the same. The sampling frequency, $f_s$, may be different for different types of media signals. For example, there may be one sampling frequency for video signals and a different sampling frequency for audio signals. The sampling frequency, $f_s$, may also be different between corresponding input and output signals. For example, the sampling frequency for the first input media signal 110 may be different than the sampling frequency for the first output media signal 118.

In general, the sampling frequency is proportional to the accuracy of the synchronization error. The higher the sampling frequency the more accurate the calculated synchronization error. However, a higher sampling frequency may also increase the amount of storage and processing required.

In one embodiment, the sampling frequency, $f_s$, is set to the frame frequency of the video signal. Typically, a video signal is transmitted as a series of frames. Each frame is identified by a start of frame ("SOF") marker, which may vary depending on the format of the video signal. For example, an analog video signal may have a vertical sync pulse to indicate the beginning of a frame, and a digital video signal may have an embedded datum that indicates the beginning of data for a frame. The frame frequency (or frame rate) is the frequency at which an imaging device produces successive frames. Since a lip-sync error of plus or minus 1 video frame is not usually noticeable, a sampling frequency equal to the video frame frequency produces synchronization error at precision of around 1 video frame period or better, and this is usually sufficient.

In this embodiment, the sampling module 204 may be triggered to sample the received feature signal 208 based on the SOF markers in the corresponding media signal. Specifically, the feature extractor 202 may generate a feature signal 208 that includes SOF indicators corresponding to the SOF markers in the media signal. The SOF indicators may be any type of signal. For example, if the feature signal 208 is a continuous analog signal, the SOF indicators may be pulses added to the continuous analog signal. If the feature signal 212 is a set of discrete values, the SOF indicators may be a tag or bit pattern that indicates the timing of the SOF markers.

The storage module 206 receives the sampled feature signal 210 output by the sampling module 204 and stores the most recent T seconds of the sampled feature signal 210. The storage module 206 is continuously updated by the sampling module 204 and can be generally described as a first-in-first-out (FIFO) buffer.

The time period, T, is typically chosen to be greater than the longest expected delay of the input media signals (e.g. 110 and 112) through the signal transport network 104. In some embodiments, T is chosen to be twice as long as the expected maximum delay, or even longer.

The time period T may be different for corresponding input and output media signals (e.g. first input media signal 110 and first output media signal 118). In one embodiment, the time period T for the output media signal is smaller than the time period T for the corresponding input media signal.

Figure 3:
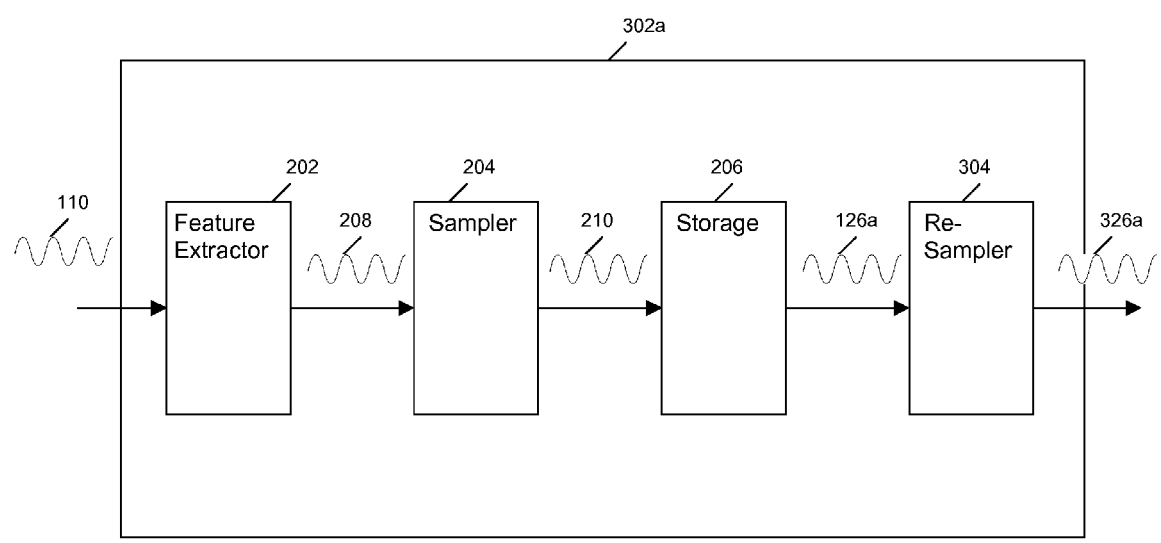
FIG. 3 is a block diagram of the feature extraction module of FIG. 1 in accordance with another embodiment.

Reference is now made to FIG. 3, in which a block diagram of a first feature extraction module 302a in accordance with an alternative embodiment is illustrated. The first feature extraction module 302a shown in FIG. 3 and described herein is intended to be an example of a feature extraction module and the principles and concepts described in relation to FIG. 3 should not be limited to the first feature extraction module 102a. Specifically, any or all of the feature extraction modules 102a, 102b, 102c and 102d of FIG. 1 may be implemented in a similar manner to the feature extraction module 302a shown in FIG. 3.

The first feature extraction module 302a is identical to feature extraction module 102a of FIG. 2 except that it also includes a re-sampling module 304.

In some situations it is preferable that the sampling rates for corresponding input and output media signals (e.g. 110 and 118) be the same. Accordingly, the feature extraction module 302a may also include a re-sampling module 304. The re-sampling module 304 re-samples the extracted feature signal 126a at a different sampling frequency, $f_r$, than the sampling frequency, $f_s$, used by the sampling module 204. The re-sampling module 304 may be used when corresponding input and output media signals (e.g. 110 and 118) are initially sampled at different sampling frequencies. For example, if the feature signal corresponding to an input media signal (e.g. 110 or 112) was sampled at 24 Hz and the feature signal corresponding to the output media signal (e.g. 118 or 120) was sampled at 30 Hz, then both feature signals can be re-sampled at 120 Hz, or alternatively the feature signal corresponding to the input media signal may be resampled at 30 Hz. The resampling module 304 can also be used to resample the feature signal at a higher sampling frequency so as to improve the accuracy of lip sync error produced.

The stored feature data for corresponding input and output media signals is retrieved by a delay calculation module 106a or 106b as an extracted feature signal 126a, 126b, 126c or 126d to determine the delay between corresponding input and output media signals (e.g. first input media signal 110 and first output media signal 118). In system 100 there are two delay calculation modules 106a and 106b, the first delay calculation module 106a uses the extracted feature signals 126a and 126c generated by the first and third feature extraction modules 102a and 102c respectively to determine the delay between the first input and output media signals 110 and 118; and the second delay calculation module 106b uses the extracted feature signals 126b and 126d generated by the second and fourth feature extraction modules 102b and 102d respectively to determine the delay between the second input and output media signals 112 and 120.

In systems where it is known that the characteristic features of the input media signals 110 and 112 will not be altered as they traverse the signal transport network 104, then basic matching methods may be used to determine the delay from the extracted feature signals (i.e. 126a and 126c). An example of a basic matching method is the simple sliding technique where one feature signal is essentially slid along and compared to the second feature signal to determine a match. A match occurs when the sum of the absolute difference between the two signals is at a minimum.

Figure 4:
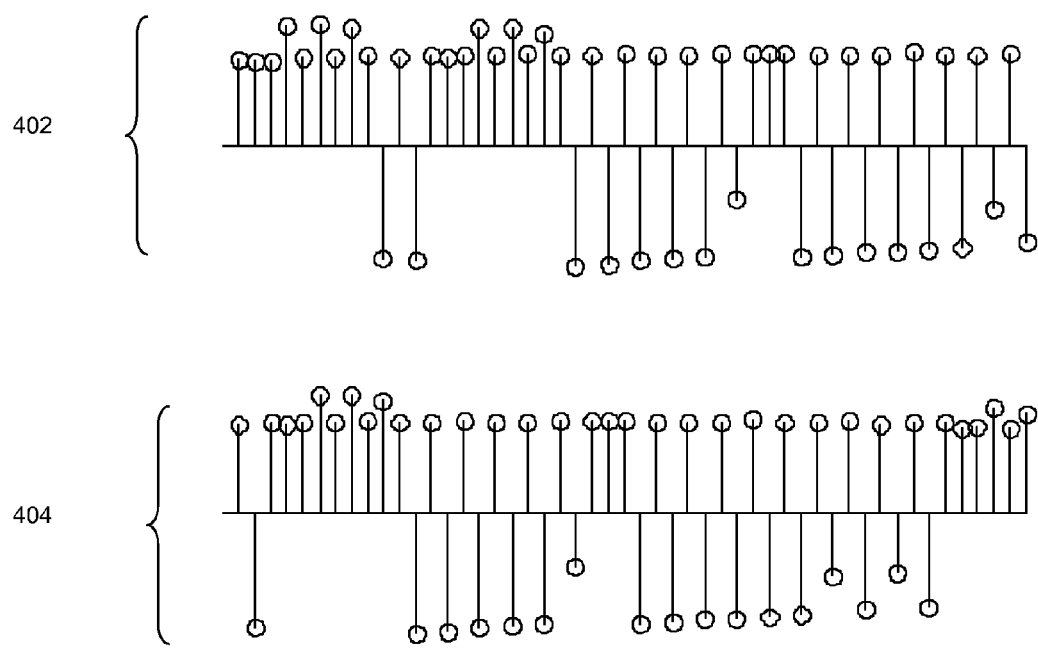
FIG. 4 is a chart illustrating a method of determining the delay between two signals using a simple sliding technique.

Reference is now made to FIG. 4, which illustrates the simple sliding technique referred to above. The first sequence 402 comprises fifty samples and represents a first feature signal. The second sequence 404 also comprises 50 samples and represents a second feature signal which is a delayed version of the first feature signal. Using the simple sliding technique the first signal 402 is shifted to the right one sample at a time until a match is found. It can be seen from FIG. 4 that the first and second sequences 402, 404 will "match" when the first sequence 402 is shifted to the right 10 samples. Accordingly, the delay between the first and second sequences 402 and 404 is equivalent to 10 samples.

However, in systems where it is possible that the characteristic features of the input media signals 110 and 112 will be altered as they traverse the signal transport network 104, then more sophisticated matching methods, such as cross-correlation, may be used.

Figure 5:
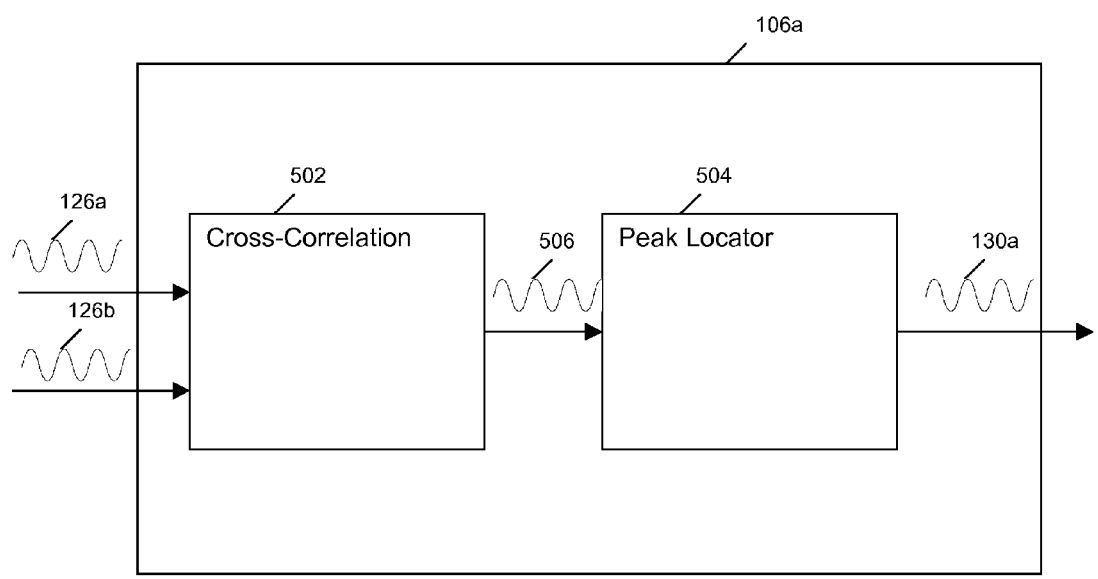
FIG. 5 is a block diagram of the delay calculation module of FIG. 1 in accordance with at least one embodiment.

Reference is now made to FIG. 5, in which a block diagram of the first delay calculation module 106a in accordance with an embodiment is illustrated. The first delay calculation module 106a shown in FIG. 5 and described herein is intended to be an example of a delay calculation module and the principles and concepts described in relation in FIG. 5 should not be limited to the first delay calculation module 106a. Specifically, any or all of the delay calculation modules 106a and 106b of FIG. 1 may be implemented in a similar manner to the delay calculation module 106a shown in FIG. 5.

The first delay calculation module 106a includes a cross-correlation module 502 and a peak locator module 504.

The cross-correlation module 502 receives the first extracted feature signal 126a corresponding to the first input media signal 110, and the third extracted feature signal 126c corresponding to the first output media signal 118. The cross-correlation module 502 may retrieve the extracted feature signals (126a and 126c) from the relevant feature extraction modules 102a and 102c or the feature extraction modules 102a and 102c may send the extracted feature signals 126a and 126c to the cross-correlation module 502 automatically. The cross-correlation module 502 then performs cross correlation on the extracted feature signals 126a and 126c and outputs a cross-correlation signal 506. Cross-correlation is a measure of the similarity of two signals, f(x) and g(x), and is defined by equation (1) where the integral is over the appropriate values of t and a superscript asterisk indicates the complex conjugate.

$$(f*g)(x) = \int f^*(t)g(x+t)dt \quad (1)$$

Cross-correlation works by essentially sliding one signal along the x-axis of the other signal, and calculating the integral of the product of the two signals for each possible amount of sliding. The integral is maximized when the functions match.

Where the signals are discrete functions, $f_i$ and $g_i$, the cross-correlation is defined by equation (2) where the sum is over the appropriate values of the integer j.

$$(f*g)_i = \sum_j f_j^* g_{i+j} \quad (2)$$

Where the first discrete function, $f_i$, has $N_1$ discrete values and the second discrete function, $g_i$, has $N_2$ discrete values then $N_1+N_2-1$ cross-correlation values can be generated.

The cross-correlation module 502 may be implemented in the time domain, or in the frequency domain using a discrete fourier transform (DFT).

The cross-correlation signal 506 output by the cross-correlation module 502 is input to the peak locator 504. The peak locator 504 determines the current peak position from the cross-correlation signal 506. The current peak position is the position at which characteristic features of corresponding input and output media signals have the best match.

The peak locator 504 then determines a delay value representing the time delay between corresponding input and output media signals (e.g. 110 and 118) based on the current peak position. The peak locator 504 then outputs the delay value as a delay signal 130a. In one embodiment, the delay value is equal to the current peak position divided by the sampling rate of the feature signal. Accordingly, the accuracy of the current peak position is directly proportional to the sampling frequency $f_s$. The higher the sampling frequency, the more accurate the current peak position.

In one embodiment the accuracy of the current peak position is increased by re-sampling the feature signal at a sampling frequency, $f_r$, greater than the original sampling frequency, $f_s$, prior to cross-correlation.

In another embodiment, the accuracy of the current peak position is increased by determining the current peak position from the peak value and the values surrounding the peak value. For example, a fine resolution peak position may be determined using interpolation such as linear interpolation or parabolic interpolation.

Figure 6:
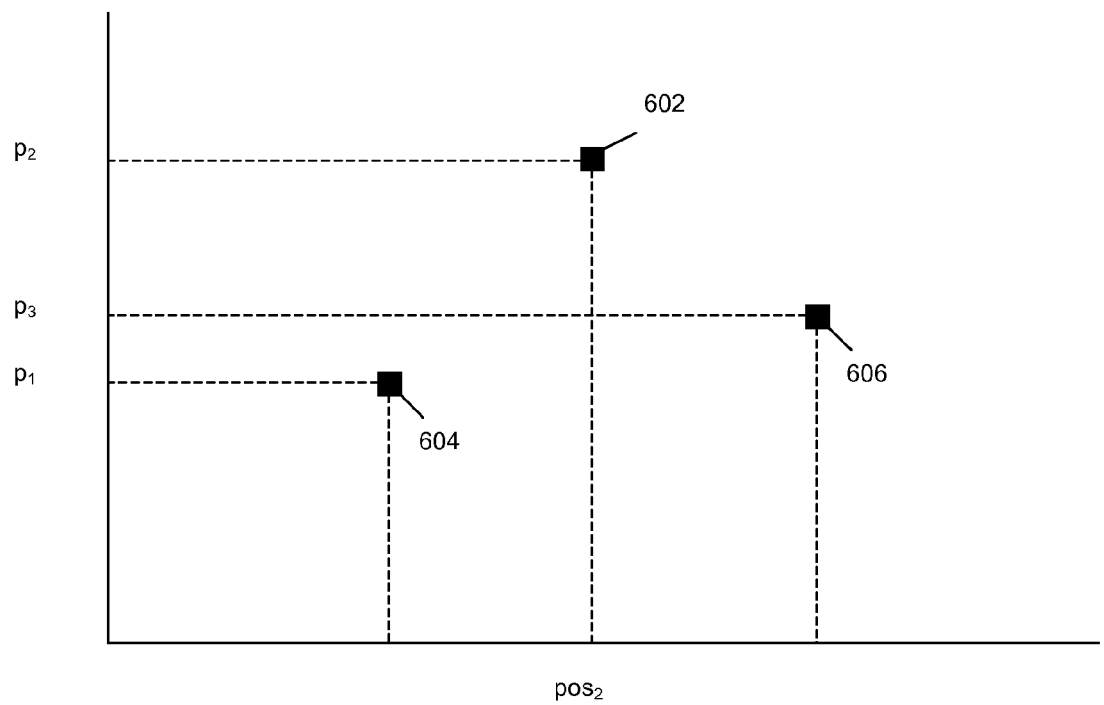
FIG. 6 is a chart illustrating a method of determining the peak position using linear interpolation in accordance with an embodiment.

Reference is now made to FIG. 6, in which a method of determining a fine resolution peak position using linear interpolation in accordance with an embodiment is illustrated. As is known to those of skill in the art, linear interpolation typically involves comparing the value of interest (i.e. the current peak) with two or more values within a predetermined distance from the value of interest.

In the exemplary method shown in FIG. 6, the current peak 602 of the cross correlation signal 506 has an amplitude $p_2$ and a position $pos_2$. The cross-correlation value immediately preceding the peak 604 has an amplitude $p_1$, and the cross-correlation value immediately following the peak 606 has an amplitude $p_3$. A more accurate peak position, $pos_A$, can be determined according to equation (3) when $p_3$ is greater than or equal to $p_1$, and according to equation (4) in all other cases.

$$pos_A = pos_2 + \frac{(p_1 - p_3)}{(p_2 - p_1)} * \frac{1}{2} \quad (3)$$

$$pos_A = pos_2 + \frac{(p_1 - p_3)}{(p_2 - p_3)} * \frac{1}{2} \quad (4)$$

In some cases the peak locator 504 may incorrectly identify the current peak position. This may occur, for example, where the cross-correlation is poor due to feature corruption caused by the signal transport network 104 or the nature of the feature data itself. Another example in which an incorrect current peak position may be identified is where the two media signals (e.g. the first input media signal 110 and the corresponding first output media signal 118) match at multiple positions. In this case there will be multiple peaks in the cross-correlation signal 506, and the highest of these peaks may not accurately represent the delay between the two media signals (e.g. first input media signal 110 and first output media signal 118). To eliminate possible false peaks, in some embodiments the peak locator 504 implements thresholding. For example, a peak may be eliminated from consideration if the cross-correlation value at the peak is lower than a predetermined percentage of the product of the total cross-correlation values from the two media signals (e.g. first input media signal 110 and first output media signal 118). In one embodiment the predetermined percentage is 5%.

The synchronization error module 108 receives the two delay signals 130a and 130b generated by the delay calculation modules 106a and 106b, and outputs a synchronization error signal 132. The synchronization error signal 132 represents the difference between the two delay signals 130a and 130b. The synchronization error signal 132 is fed to the signal transport network 104 where it is used to correct the synchronization error. In some embodiments, the synchronization error may be corrected by adding a delay to the path that has the shorter delay, reducing the delay to the path that has the longer delay, or both.

In some embodiments, one or more of the feature extraction modules 102a, 102b, 102c or 102d further includes a processing module. The processing module processes the feature signal (e.g. feature signal 208) to improve cross-correlation. For example, the processing module may be a differentiator or may be a combination of a differentiator and a logarithmic module. The processing module may be situated between the sampler 204 and the storage module 206 or alternatively it may be situated after the storage module 206.

In some embodiments, system 100 is used to generate the synchronization error once and in other embodiments the synchronization error is generated periodically. Where the synchronization error is generated on a periodic basis, either or both of the peak locator 504 and the synchronization error module 108 may further include a filter for smoothing the peak signal 508 and the synchronization error signal 132 respectively. The filters may be moving average filters.

System 100 has been described in the context of synchronizing two media signals 110 and 112. However, in other embodiments three or more media signals are synchronized by extracting the characteristic features of each media signal at the input and output of the signal transport network 104 and detecting the delay of each media signal.

Figure 7:
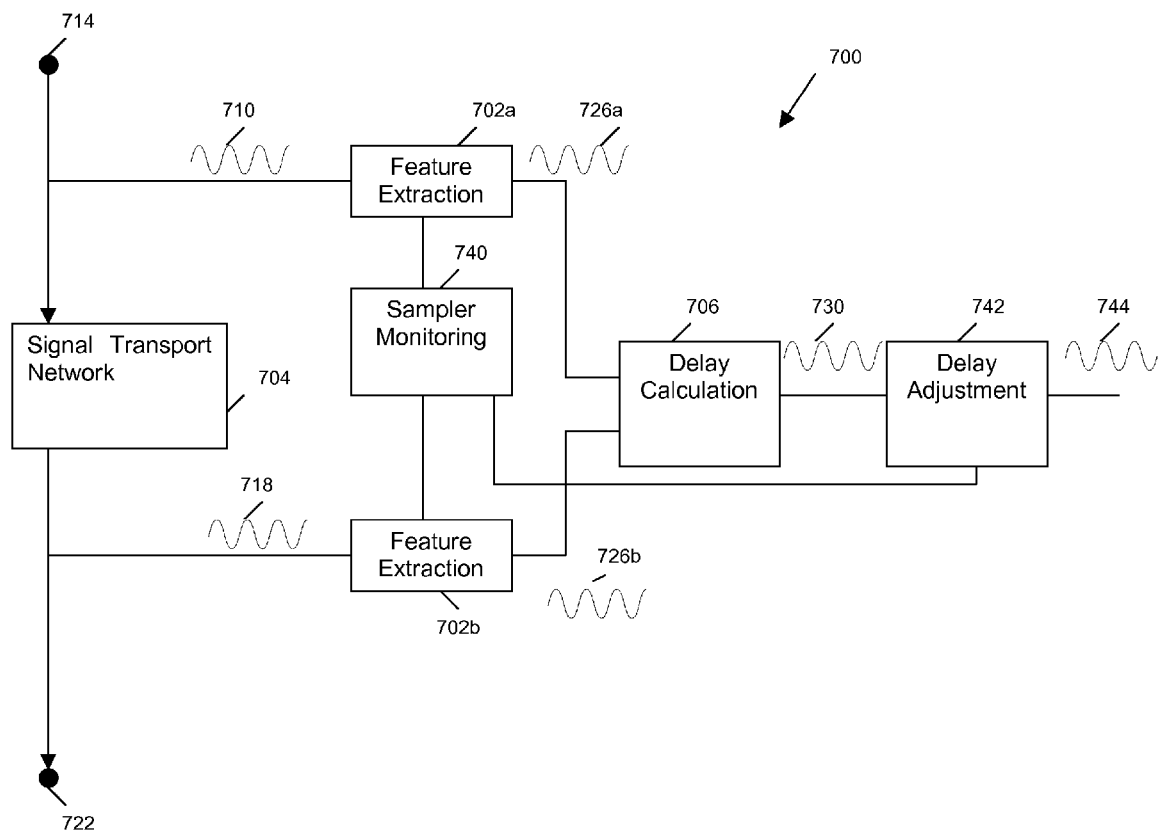
FIG. 7 is a block diagram of a system for determining the delay between media signals in accordance with an embodiment.

Reference is now made to FIG. 7, in which a system 700 for determining the time delay between two media signals in accordance with an embodiment is illustrated. Components of system 700 that correspond to components of system 100 are identified with similar reference numerals.

Where one of the media signals is a version of the other media signal after it traversed a signal network (e.g. one of the media signals is the input to a signal transport network and the other media signal is the output from the signal transport network), the time delay represents the amount of time it takes for the media signal to travel through the signal transport network. It some applications it is desirable to know the delay for a media signal to travel through a signal transport network.

The system 700 includes two feature extraction modules 702a and 702b, a signal transport network 704, a sampler monitoring module 740, a delay calculation module 706, and a delay adjustment module 742.

A first media signal 710 is input into the system 700 at an input terminal 714. The input terminal 714 is coupled to one of the feature extraction modules 702a, and also to the signal transport network 704. The first media signal 710 is transported through the signal transport network 704 and output as a second media signal 718 at output terminal 722. The first and second media signals 710 and 718 may be video signals, audio signals or video/audio signals.

The signal transport network 704 corresponds to the signal transport network 104 of FIG. 1. Specifically, the signal transport network 704 will typically include audio and video signal transportation devices which transport the first media signal 710 from one point to another. The signal transport network 704 may also include audio and video processing devices which modify the first media signal 710. Where the signal transport network 704 includes processing devices, the second media signal 718 may be different than the first media signal 710. For example, an MPEG compressor introduces compression artifacts in a video signal and a video standard converter changes the video size and/or frame rate of the video signal.

The feature extraction modules 702a and 702b, the sampler monitoring module 740, the delay calculation module 706, and the delay adjustment module 742 operate to determine the time delay between the first and second media signals 710 and 718.

Each feature extraction module 702a and 702b extracts at least one characteristic feature from the first or second media signal 710 and 718, and outputs an extracted feature signal 726a or 726b. Specifically, the first feature extraction module 702a extracts at least one characteristic feature from the first media signal 710, and outputs a first extracted feature signal 726a The second feature extraction module 702b extracts at least one characteristic feature from the second media signal 718 and outputs a second extracted feature signal 726b. The feature extraction modules 702a and 702b may be implemented as the feature extraction modules 106a and 306a described in reference to FIGS. 2 and 3 respectively. In particular, the feature extraction modules 702a and 702b may include a feature extractor, a sampling module, and a storage module.

As described above, the feature extractor receives a media signal (i.e. first media signal 710, or second media signal 718), extracts one or more characteristic features from the media signal, and outputs a feature signal. The feature signal corresponding to the first media signal 710 will be referred to as the first feature signal and the feature signal corresponding to the second media signal 718 will be referred to as the second feature signal. The sampling module receives the feature signal from the feature extractor, samples it at a sampling frequency, and outputs a sampled feature signal. The sampled feature signal corresponding to the first media signal 710 will be referred to as the first sampled feature signal and the sampled feature signal corresponding to the second media signal 718 will be referred to as the second sampled feature signal. The storage module receives the sampled feature signal output by the sampling module and stores the most recent T seconds of the sampled feature signal.

It is possible that the sampling of the first feature signal and the second feature signal occur at different times. This may occur, for example, because the second media signal 718 is out of phase with the first media signal 710. This may also occur if the second media signal 718 is in a different format than the first media signal 710 and has SOF markers at a different frequency than the first media signal 710. The sampler monitoring module 740 is designed to determine the difference between the first feature signal sampling time and the second feature signal sampling time. This time difference will be referred to as the sampler time difference.

In some embodiments, the difference between the first feature signal sampling time and the second feature signal sampling time may be determined each time that the feature signals are sampled. For example, in one embodiment the sampler monitoring module 740 may include a high-resolution clock that is started (or reset) when the first feature signal is sampled, and stopped when the second feature signal is sampled. In other embodiments the high-resolution clock may be started (or reset) when the second feature signal is sampled, and stopped when the first feature signal is sampled.

The delay calculation module 706 corresponds to delay calculation module 106 of FIG. 1. Specifically, the delay calculation module 706 determines the amount of delay between the first and second media signals 710 and 718 from the first and second extracted feature signals 726a and 726b generated by the first and second feature extraction modules 702a and 702b respectively. The delay calculation module 706 outputs a delay signal 730 that represents the calculated delay. The delay signal 730 may be provided as a series of discrete values or as an analog signal.

In systems where it is known that the characteristic features of the first media signal 710 will not be altered as they traverse the signal transport network 704, basic matching methods may be used to determine the delay from the extracted feature signals 726a and 726b. An example of a basic method matching method is the simple sliding technique, which was described in reference to FIG. 4. However, in systems where it is possible that the characteristic features of the first media signal 710 will be altered as they traverse the network 704, more sophisticated matching methods may be used. An example of a more sophisticated matching method is cross-correlation, which was described in reference to FIG. 5. The delay calculation module 706 may be implemented as the delay calculation module 106a described in reference to FIG. 5.

The delay adjustment module 742 adjusts the delay signal 730 produced by the delay calculation module 706 to account for the different sampling times, and outputs an adjusted delay signal 744. The adjusted delay signal 744 may be provided as a series of discrete values or as an analog signal. In one embodiment, if the most recent extracted feature signal 126a and 126b data corresponds to the second media signal 718, the adjusted delay signal 744 is calculated in accordance with equation (5), and if the most recent extracted feature signal 126a and 126b data corresponds to the first media signal 710, the adjusted delay signal 744 is calculated in accordance with equation (6). However, it will be evident to a person of skill in the art that the adjusted delay signal 744 may be calculated in other ways.

$$\text{adjusted delay signal} = \text{delay signal} + \text{sampler time difference} \quad (5)$$

$$\text{adjusted delay signal} = \text{delay signal} + \text{sampler time difference} - \text{input sampling period} \quad (6)$$

In some embodiments, the delay adjustment module 742 may include a filter (not shown) for smoothing the adjusted delay signal 744. The filter may be a moving average filter.

Figure 8:
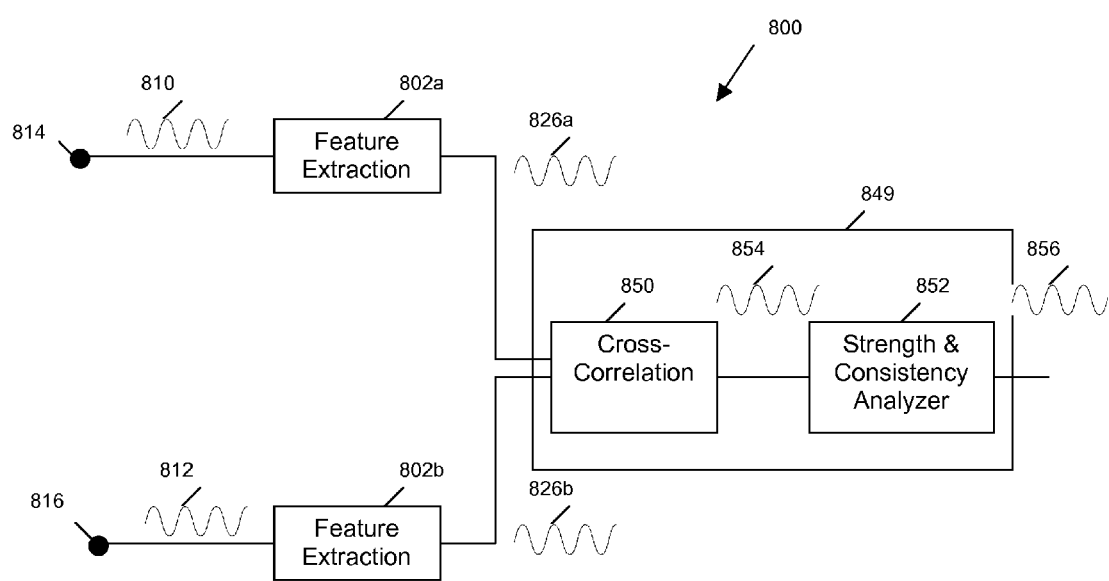
FIG. 8 is a block diagram a system for determining the likelihood that two media signals match in accordance with a first embodiment.

Reference is now made to FIG. 8, in which a system 800 for determining the likelihood that two media signals match in accordance with an embodiment is illustrated. Components of system 800 that correspond to components of system 100 are identified with similar reference numerals.

As described above, two media signals are said to match if they represent the same content. For example, a high quality video of a movie and a DVD version of the same movie are said to match. Such information is often required in the video dubbing/conversion industry. For example, a high quality video content on a professional video tape may be reproduced onto a DVD. It is important to ensure that the content of the high quality video has been faithfully copied onto the DVD. Typically, a human is required to watch the entire DVD to manually verify its contents. However, such a method is time consuming and prone to human error. In other prior art systems, the media signals are aligned and a subtraction or signal to noise ratio (SNR) is performed. The problems with these types of prior art systems, however, is that they typically require a large amount of memory or storage and they require that the medial signals be of the same temporal rate and size.

The system 800 of FIG. 8 includes two feature extraction modules 802a and 802b and a match confidence signal generator 849. The match confidence signal generator 849 includes a cross correlation module 850, and a strength and consistency analyzer 852.

First and second media signals 810 and 812 are input into the system 800 at first and second input terminals 814 and 816 respectively. Each input terminal 814, 816 is coupled to one of the feature extraction modules 802a, 802b.

Each feature extraction module 802a, 802b extracts at least one characteristic feature from a media signal 810 or 812 and outputs an extracted feature signal 826a or 826b. Specifically, the first feature extraction module 802a extracts at least one characteristic feature from the first input media signal 810 to produce a first extracted feature signal 826a; and, the second feature extraction module 802b extracts at least one characteristic feature from the second input media signal 812 to produce a second extracted feature signal 826b. The feature extraction modules 802a and 802b may be implemented as either of the feature extraction modules 106a and 306a described in reference to FIGS. 2 and 3 respectively. Specifically, each feature extraction module 802a and 802b may include a feature extractor, a sampling module, and a storage module.

As described above, the feature extractor receives an input media signal (i.e. first or second input media signal 810 or 812), extracts one or more characteristic features from the media signal, and outputs a feature signal. The sampling module receives the feature signal from the feature extractor, samples it at a sampling frequency, and outputs a sampled feature signal. The storage module receives the sampled feature signal output by the sampling module and stores the most recent T seconds of the sampled feature signal.

The match confidence signal generator 849 receives the first and second extracted feature signals 826a and 826b generated by the first and second feature extraction modules 802a and 802b and generates a match confidence signal 856. The match confidence signal 856 represents the likelihood or probability that the first and second input media signals 810 and 818 "match" (i.e. they represent the same content). In one embodiment, the match confidence signal generator 849 includes a cross correlation module 850 and a strength and consistency analyzer 852.

The cross correlation module 850 performs cross correlation on the first and second extracted feature signals 826a and 826b generated by the first and second feature extraction modules 802a and 802b respectively, and outputs a cross-correlation signal 854. Cross-correlation was described in detail in reference to FIG. 5. The cross correlation module 850 may be implemented as the cross-correlation module 502 described in reference to FIG. 5.

The strength and consistency analyzer 852 analyzes the cross-correlation signal 854 generated by the cross correlation module 850 and outputs the match confidence signal 856. An exemplary strength and consistency analyzer 852 will be described in reference to FIG. 9.

Figure 9:
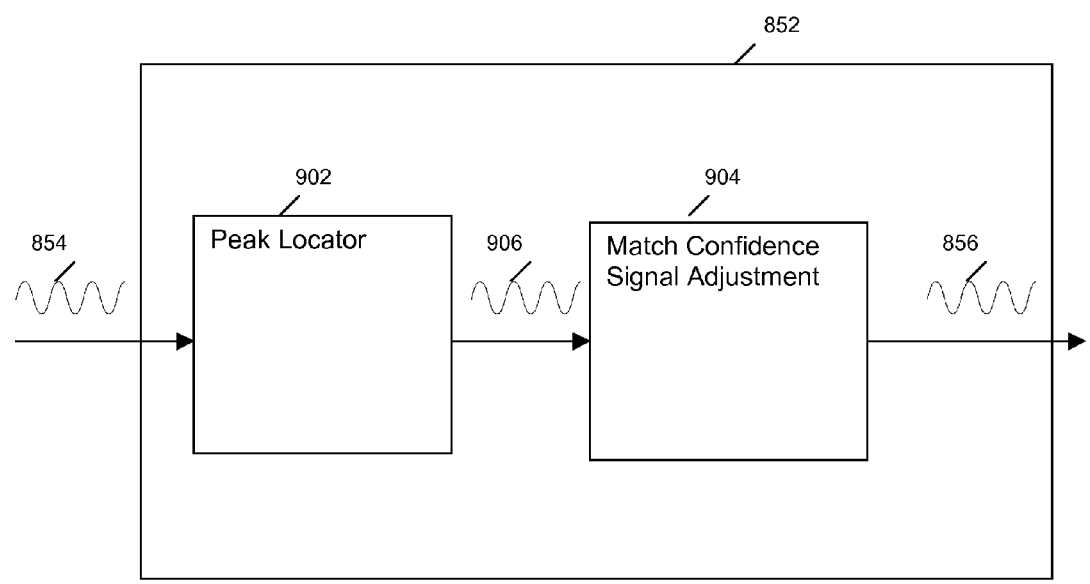
FIG. 9 is a block diagram of the strength and consistency analyzer of FIG. 8 in accordance with an embodiment.

Reference is now made to FIG. 9, wherein a strength and consistency analyzer 852 in accordance with an embodiment is illustrated. The strength and consistency analyzer 852 includes a peak locator module 902 and a match confidence signal adjustment module 904.

The peak locator module 902, similar to peak locator module 504 of FIG. 5, determines the current peak position from the cross-correlation signal 854 generated by the cross-correlation module 850. As described above, the current peak position is the position at which the characteristic features of two media signals (i.e. first and second input media signals 810 and 812) have the best match. The current peak position is typically the position at which the highest cross-correlation value occurs. This value is referred to as the current peak value. The peak locator module 902 outputs a peak signal 906 that represents the current peak position and the current peak value.

In some cases, the peak locator module 902 may incorrectly identify the current peak position. This may occur, for example, due to feature corruption, or the nature of the characteristic feature data itself. In these cases, the current peak value is typically low. To eliminate these false peaks, in some embodiments, the peak locator module 902 implements thresholding. For example, a peak may be eliminated from consideration if the cross-correlation value at the peak is lower than a predetermined percentage of the product of the total cross-correlation values. In one embodiment, the predetermined percentage is 5%.

The match confidence signal generator 904 receives the peak signal 906 (representing the current peak position and current peak value) from the peak locator module 902 and generates the match confidence signal 856. The match confidence signal 856 may be provided as a series of discrete values or an analog signal. As described above, the match confidence signal 856 represents the likelihood or the probability that the two input media signals 810 and 812 match (i.e. represent the same content). The match confidence signal 856 may be genereteed from the current peak value or the current peak position. However, since two different media streams may still produce a high peak value, the current peak value is preferably determined from the current peak value and the current peak position. The match confidence signal 856 typically ranges between a high match value, which indicates a high probability that the media signals match; and a low match value, which indicates a low probability that the media signals match.

In one embodiment, the match confidence signal 856 is calculated as follows. If the current peak value is low then the match confidence signal 856 is adjusted to be closer to the low match value. In some embodiments, this involves decreasing the match confidence signal 856. A current peak value may be deemed to be low if it falls below a predetermined matching peak threshold.

If, however, the current peak value is not low (e.g. the current peak value meets or exceeds the predetermined matching peak threshold) then the match confidence signal 856 is adjusted to be closer to the high match value (e.g. the match confidence signal 856 may be increased) if the current peak position is similar to one or more previous peak positions, and adjusted to be closer to the low match value (e.g. the match confidence level may be decreased) if the current peak position is not similar to one or more previous peak positions. In one embodiment, an average of the peak positions is generated and the current peak position is compared against the average of the previous peak positions. In this embodiment, a new average peak position is calculated after each new current peak position.

It will be evident to a person of skill in the art that the match confidence signal 856 may be calculated in accordance with other algorithms.

Figure 10:
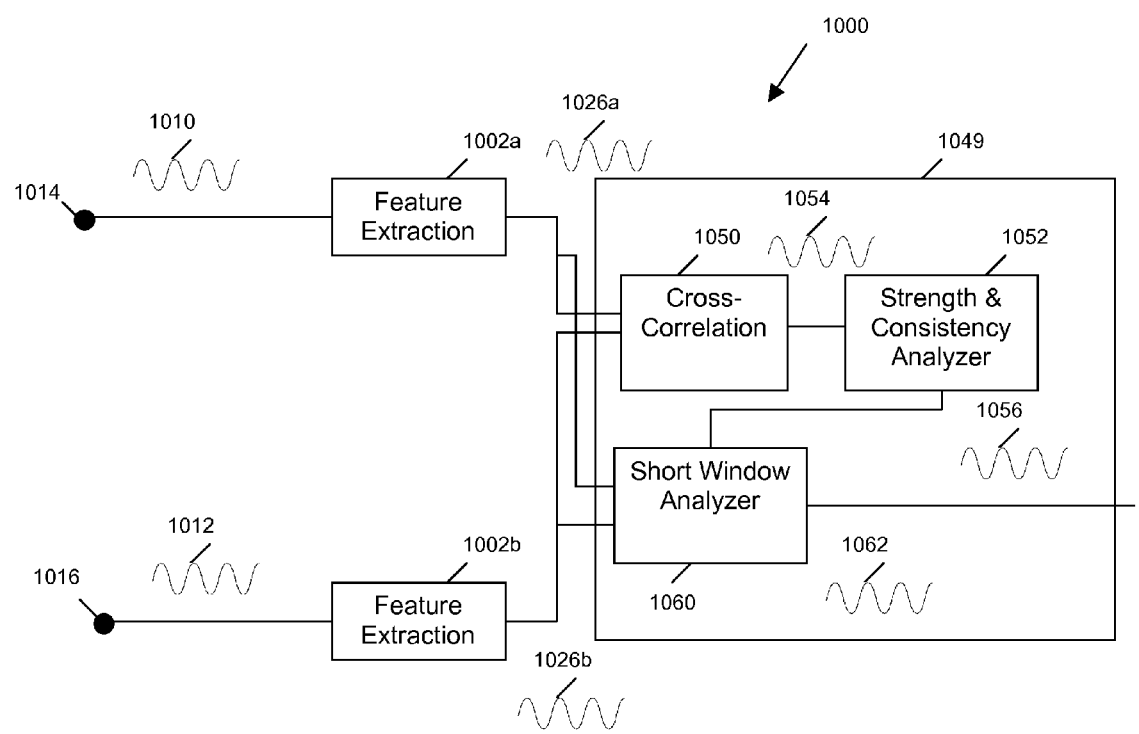
FIG. 10 is a block diagram of a system for determining the likelihood that two media signals match in accordance with a second embodiment.

Reference is now made to FIG. 10, in which a system 1000 for determining the likelihood that two media signals match in accordance with a second embodiment is illustrated. The only difference between the system 1000 of FIG. 10 and the system 800 of FIG. 8 is the addition of a short window analyzer 1060 to the match confidence signal generator 1049. Components of system 1000 that correspond to components of system 800 are identified with similar reference numerals.

In general, the cross correlation length (the time period over which the cross correlation is performed) used by the cross-correlation module 1050 is longer than the delay between the input media signals 1010 and 1012. However, the longer the cross correlation length, the longer it takes for the match confidence level to drop when the input media signals start to differ. To speed up the time it takes for the match confidence level to reflect the fact that the two media signals 1010 and 1012 no longer match, a short window analyzer 1060 is added to the system 1000. The short window analyzer 1060 (i) analyzes the first and second feature data over a shorter period or length than the cross correlation module 1050; and (ii) updates the match confidence signal 856 accordingly.

Figure 11:
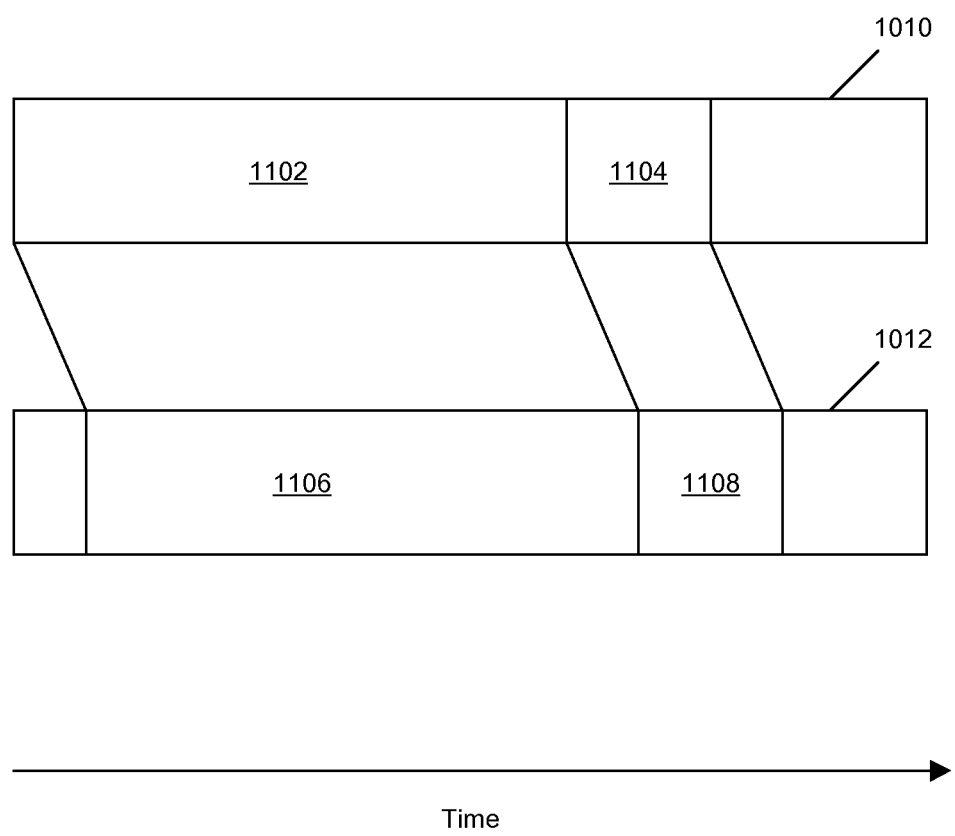
FIG. 11 is a chart illustrating exemplary first and second media signals as a function of time.

Reference is now made to FIG. 11 to illustrate the short window analyzer concept. FIG. 11 illustrates the first input media signal 1010 and the second input media signal 1012 as a function of time. Each input media signal 1010 and 1012 has been divided into portions. The first input media signal 1010 has a first portion 1102 and a second portion 1104. Similarly, the second input media signal 1012 has first and second portions 1106, 1108 respectively.

As shown in FIG. 11, the first input media signal 1010 is "ahead" of second media signal 1012, meaning that if the first and second input media signals 1010 and 1012 have the same content, the content will appear in the first input media signal 1010 before it appears in the second input media signal 1012.

If the first portion 1102 of the first input media signal 1010 matches the first portion 1106 of the second input media signal 1012 then the match confidence level will be closer to the high match value for the cross-correlation window shown in FIG. 11. However, if the second portion 1104 of the first input media signal 1010 does not match the second portion 1108 of the second input media signal 1012, it will take a long time for the match confidence level to be adjusted to be closer to the low match value since the majority of the window still matches.

In one embodiment, the short window analyzer 1060 selects a window of the first sampled feature signal (the sampled feature signal corresponding to the first media signal 1010) and a window, of a corresponding size, of the second sampled feature signal (the sampled feature signal corresponding to the second media signal 1012) to analyze. The windows used by the short window analyzer 1060 are shorter than the cross-correlation length used by the cross-correlation module 1050. In one embodiment, one of the windows represents the most recent feature data for a particular input media signal, and the other window represents the corresponding feature data for the other input media signal. For example, one window may represent the second portion 1108 of the second input media signal 1012, and the other window may represent the second portion 1104 of the first input media signal.

The location of the second portion 1104 of the first input media signal 1010 can easily be determined from the average peak position calculated by the strength and consistency analyzer 1052. Specifically, as described above in relation to FIG. 3, the peak position reflects the amount of delay between the two input media signals 1010 and 1012. Specifically, the amount of delay is equal to the peak position divided by the sampling frequency.

Figure 12:
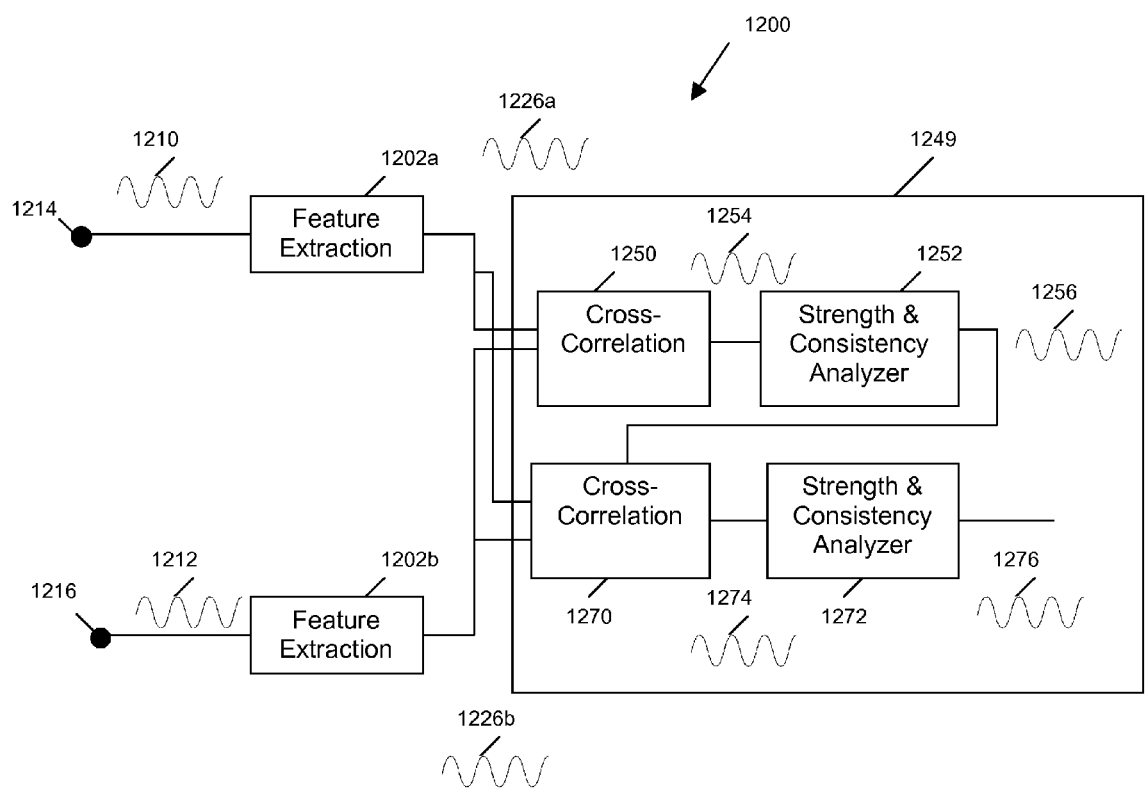
FIG. 12 is a block diagram of a system for determining the likelihood that two media signals match in accordance with a third embodiment.

Once the two windows are selected, the short window analyzer 1060 compares the data in the two windows to see if they match. In some embodiments, this may involve a basic comparison. For example, in one embodiment, the comparison involves calculating the sum of absolute difference between the first and second sampled feature data. If the result is lower than a predetermined threshold then the match confidence signal 1056 is considered to be valid and is not adjusted. If, however, the result is higher than a predetermined threshold, then the match confidence signal 1056 is not considered to be valid and is adjusted to be closer to the low match value (e.g. in some embodiments this may involve decreasing the match confidence signal 1056). In other embodiments, more complex comparison techniques may be used Reference is now made to FIG. 12, in which a system 1200 for determining the likelihood that two media signals match in accordance with a third embodiment is illustrated. The only difference between the system 1200 of FIG. 12 and the system 1000 of FIG. 10 is that the short window analyzer 1060 of the match confidence signal generator 1049 of FIG. 10 has been replaced with a second cross correlation module 1270 (referred to as the short cross correlation module) and a second strength and consistency analyzer 1272. Components of system 1200 that correspond to components of systems 800 and 1000 are identified with similar reference numerals.

The second cross correlation module 1270 and the second strength and consistency analyzer 1272 work together to perform the same function as the short window analyzer 1060 of FIG. 10. Specifically, they operate to analyze the extracted feature data over a smaller window than the first cross correlation module 1250 and the first strength and consistency analyzer 1252 so as to more quickly adapt to sudden mismatches or matches between the two media signals.

The second cross correlation module 1070 operates in a similar manner to the first cross correlation module 1250 except it uses a smaller cross correlation window, and it uses the average peak position generated by the first strength and consistency analyzer 1252 to select the extracted feature data to analyze. After performing a cross correlation on the selected data, the second cross correlation module 1070 outputs a second cross correlation signal 1274.

The second strength and consistency analyzer 1272 received the second cross correlation signal 1274 and adjusts the match confidence signal 1256 generated by the first strength and consistency analyzer 1252 to produce an adjusted match confidence signal 1276.

While the above description provides examples of various embodiments of the invention, it will be appreciated that some features and/or functions of the described embodiments are susceptible to modification without departing from the spirit and principles of operation of the described embodiments. What has been described above has been intended to be illustrative of the invention and non-limiting and it will be understood by persons skilled in the art that other variants and modifications may be made without departing from the scope of the invention as defined in the claims appended hereto.

I claim:

1. A method of comparing media signals comprising:
   receiving a first input media signal and a second input media signal;
   extracting a first characteristic feature from the first input media signal to generate a first feature signal;
   sampling the first feature signal to produce a first sampled feature signal;
   extracting a second characteristic feature from the second input media signal to generate a second feature signal;
   sampling the second feature signal to produce a second sampled feature signal;
   cross-correlating the first and second sampled feature signals to generate a cross-correlation signal;
   providing a match confidence signal based on the cross-correlation signal, wherein the match confidence signal has a value between a high match value and a low match value and wherein the match confidence signal is an estimate of the likelihood that that the first input media signal corresponds to the second input media signal;
   analyzing the cross-correlation signal to identify a current peak value within the cross-correlation signal by comparing the cross-correlation signal to a predetermined matching peak threshold; and
   modifying the match confidence signal based on the comparison, wherein if the current peak value exceeding the matching peak threshold is identified, the match confidence signal is modified to be closer to the high match value, and if the current peak value exceeding the matching peak threshold is not identified, the match confidence signal is modified to be closer to the low match value.

2. The method of claim 1, wherein providing the match confidence signal includes:
   further analyzing the cross-correlation signal based on peak position within the cross-correlation signal; and
   modifying the match confidence signal based on the analysis.

3. The method of claim 2, wherein the match confidence signal has a value between a high match value and a low match value and wherein providing the match confidence signal includes:
   analyzing the cross-correlation signal to identify a current peak position within the cross-correlation signal;
   if the current peak position corresponds to one or more previous peak positions, then modifying the match confidence signal to be closer to the high match value; and
   if the current peak position does not correspond to the one or more previous peak positions, then modifying the match confidence signal to be closer to the low match value.

4. The method of claim 2, further comprising comparing the first and second feature signals, and modifying the match confidence signal based on the comparison.

5. The method of claim 4, wherein comparing the first feature signal to the second feature signal includes:
   identifying a portion of the first feature signal;
   identifying a portion of the second feature signal corresponding to the identified portion of the first feature signal; and
   comparing the identified portions of the first and second feature signals.

6. The method of claim 5, wherein identifying the portion of the second feature signal corresponding to the identified portion of the first feature signal includes:
   analyzing the cross-correlation signal to identify a current peak position within the cross-correlation signal;
   converting the current peak position into a delay value, wherein the delay value represents the time delay between the first and second input media signals; and
   identifying the portion of the second feature signal based on the delay value.

7. The method of claim 1, wherein providing the match confidence signal includes:
   cross-correlating a first portion of the first sampled feature signal and a first portion of the second sampled feature signal to generate a first cross-correlation signal;
   identifying a second portion of the first sampled feature and a second portion of the second sampled feature, wherein the second portions of the first and second sampled feature signals are smaller than the first portions of the first and second sampled feature signals respectively;
   cross-correlating the second portion of the first sampled feature signal and the second portion of the second sampled feature signal to generate a second cross-correlation signal; and
   modifying the match confidence signal based on the first and second cross-correlation signals.

8. The method of claim 7, wherein identifying the second portion of the first sampled feature and the second portion of the second sampled feature includes:
   analyzing the first cross-correlation signal to identify a current peak position within the first cross-correlation signal;
   converting the current peak position into a delay value, wherein the delay value represents the time delay between the first and second input media signals; and
   identifying the second portions of the first and second feature signals based on the delay value.

9. The method of claim 1, wherein the match confidence signal is provided as a series of discrete values.

10. The method of claim 1, wherein the match confidence signal is provided as an analog signal.

11. The method of claim 1, wherein the first characteristic feature includes at least one characteristic selected from the group consisting of: average luma value, average color value, average motion distance, and contrast level.

12. The method of claim 1, wherein the first characteristic feature includes at least one characteristic selected from the group consisting of: envelope of signal amplitude, average loudness level, peak formant, and average zero crossing rate.

13. A system for comparing media signals comprising:
a first input port for receiving a first input media signal;
a second input port for receiving a second input media signal;
a first extraction module for extracting a first characteristic feature from the first input media signal to generate a first feature signal and sampling the first feature signal to produce a first sampled feature signal;
a second extraction module for extracting a second characteristic feature from the second input media signal to generate a second feature signal and sampling the second feature signal to produce a second sampled feature signal; and
a match confidence signal generator for cross-correlating the first and second sampled feature signals to generate a cross-correlation signal and providing a match confidence signal based on the cross-correlation signal, wherein the match confidence signal is an estimate of the likelihood that that the first input media signal corresponds to the second input media signal, and wherein the match confidence signal has a value between a high match value and a low match value; and
the match confidence signal generator being further configured to analyze the cross-correlation signal to identify a current peak value within the cross-correlation signal by comparing the cross-correlation signal to a predetermined matching peak threshold and modify the match confidence signal based on the comparison, wherein if the current peak value exceeding the matching peak threshold is identified, the match confidence signal is modified to be closer to the high match value, and if the current peak value exceeding the matching peak threshold is not identified, the match confidence signal is modified to be closer to the low match value.

14. The system of claim 13, wherein
the first extraction module comprises:
a first feature extractor for extracting the first characteristic feature from the first input media signal to generate the first feature signal; and
a first sampling module for sampling the first feature signal to produce the first sampled feature signal;
the second extraction module comprises:
a second feature extractor for extracting the second characteristic feature from the second input media signal to generate the second feature signal; and
a second sampling module for sampling the second feature signal to produce the second sampled feature signal; and
the match confidence signal generator comprises:
a cross correlation module for cross-correlating the first and second sampled feature signals to generate the cross-correlation signal; and
a strength and consistency analyzer for modifying the match confidence signal based on the cross-correlation signal.

15. The system of claim 14, wherein the strength and consistency analyzer comprises:
a peak locator for analyzing the cross-correlation signal to identify the current peak value within the cross-correlation signal; and
a match confidence signal adjustment module for:
if the current peak value exceeds the matching peak threshold, then modifying the match confidence signal to be closer to the high match value; and
if the current peak value does not exceed the matching peak threshold, then modifying the match confidence signal to be closer to the low match value.

16. The system of claim 14, wherein the match confidence signal has a value between a high match value and a low match value and wherein the strength and consistency analyzer comprises:
a peak locator for analyzing the cross-correlation signal to identify a current peak position within the cross-correlation signal; and
a match confidence signal adjustment module for:
if the current peak position corresponds to one or more previous peak positions, then modifying the match confidence signal to be closer to the high match value; and
if the current peak position does not correspond to the one or more previous peak positions, then modifying the match confidence signal to be closer to the low match value.

17. The system of claim 14, wherein the match confidence signal generator further comprises a small window analyzer for:
comparing the first feature signal to the second feature signal; and
modifying the match confidence signal based on the results of the comparison.

18. The system of claim 17, wherein comparing the first feature signal to the second feature signal includes:
identifying a portion of the first feature signal;
identifying a portion of the second feature signal corresponding to the identified portion of the first feature signal; and
comparing the identified portions of the first and second feature signals.

19. The system of claim 18, wherein identifying the portion of the second feature signal corresponding to the identified portion of the first feature signal includes:
analyzing the cross-correlation signal to identify a current peak position within the cross-correlation signal;
converting the current peak position into a delay value, wherein the delay value represents the time delay between the first and second input media signals; and
identifying the portion of the second feature signal based on the delay value.

20. The system of claim 13, wherein:
the cross correlation module comprises:
a first cross correlation module for cross-correlating a first portion of the first sampled feature signal and a first portion of the second sampled feature signal to generate a first cross-correlation signal; and
a second cross correlation module for cross-correlating a second portion of the first sampled feature signal and a second portion of the second sampled feature signal to generate a second cross-correlation signal,
wherein the second portions of the first and second sampled feature signals are smaller than the first portions of the first and second sampled feature signals respectively; and
wherein the least one strength and consistency analyzer modifies the match confidence signal based on the first and second cross-correlation signals.

21. The system of claim 20, wherein the second cross correlation module is adapted to identify the second portions of the first and second sampled feature signals, wherein identifying the second portions of the first and second sampled feature signals includes:
- analyzing the first cross-correlation signal to identify a current peak position within the first cross-correlation signal;
- converting the current peak position into a delay value, wherein the delay value represents the time delay between the first and second input media signals; and
- identifying the second portions of the first and second feature signals based on the delay value.

22. The system of claim 13, wherein the match confidence signal is provided as a series of discrete values.

23. The system of claim 13, wherein the match confidence signal is provided as an analog signal.

24. The system of claim 13, wherein the first characteristic feature includes at least one characteristic selected from the group consisting of: average luma value, average color value, average motion distance, and contrast level.

25. The system of claim 13, wherein the first characteristic feature includes at least one characteristic selected from the group consisting of: envelope of signal amplitude, average loudness level, peak formant, and average zero crossing rate.

* * * * *